United States Patent
Ansari et al.

(10) Patent No.: US 7,260,825 B2
(45) Date of Patent: Aug. 21, 2007

(54) SYSTEM FOR PROVIDING DBS AND DSL VIDEO SERVICES TO MULTIPLE TELEVISION SETS

(75) Inventors: Ahmad Ansari, Austin, TX (US); Brad Allen Medford, Austin, TX (US); Russell William White, Austin, TX (US); David Bruce Hartman, Austin, TX (US)

(73) Assignee: SBC Properties, L.P., Reno, NV (US)

( * ) Notice: Subject to any disclaimer, the term of this patent is extended or adjusted under 35 U.S.C. 154(b) by 349 days.

(21) Appl. No.: 10/191,743

(22) Filed: Jul. 8, 2002

(65) Prior Publication Data

US 2004/0006769 A1 Jan. 8, 2004

(51) Int. Cl.
*H04N 7/18* (2006.01)

(52) U.S. Cl. .......................... 725/82; 725/74; 725/78; 725/80; 348/552

(58) Field of Classification Search .................. 725/74, 725/80, 83, 111, 114, 116, 146, 63, 82, 68, 725/71, 78; 348/734, 552
See application file for complete search history.

(56) References Cited

U.S. PATENT DOCUMENTS

| | | | |
|---|---|---|---|
| 5,574,964 A | 11/1996 | Hamlin | |
| 5,677,905 A | 10/1997 | Bigham et al. | |
| 5,734,589 A | 3/1998 | Kostreski et al. | |
| 5,828,403 A | 10/1998 | DeRodeff et al. | |
| 5,923,361 A | 7/1999 | Sutton, Jr. | |
| 5,936,660 A | 8/1999 | Gurantz | |
| 5,968,118 A | 10/1999 | Sutton, Jr. | |
| 6,188,871 B1 | 2/2001 | Kitamura et al. | |
| 6,205,582 B1 | 3/2001 | Hoarty | |
| 6,317,884 B1 | 11/2001 | Eames et al. | |
| 6,598,231 B1 | 7/2003 | Basawapatna et al. | |
| 6,888,850 B2 * | 5/2005 | Perini et al. ................. | 370/486 |
| 7,096,489 B2 * | 8/2006 | Kitsukawa et al. ......... | 725/109 |
| 2002/0007490 A1 | 1/2002 | Jeffery | |
| 2002/0007494 A1 | 1/2002 | Hodge | |
| 2002/0012353 A1 | 1/2002 | Gerszberg et al | |
| 2002/0019984 A1 | 2/2002 | Rakib | |
| 2002/0031120 A1 | 3/2002 | Rakib | |
| 2002/0044225 A1 | 4/2002 | Rakib | |
| 2002/0059637 A1 | 5/2002 | Rakib | |
| 2002/0078465 A1 | 6/2002 | Stahl et al. | |
| 2002/0129375 A1 * | 9/2002 | Kim et al. ................... | 725/100 |
| 2002/0129383 A1 * | 9/2002 | Wasilewski ................. | 725/139 |
| 2002/0152464 A1 | 10/2002 | Kitsukawa et al. | |

* cited by examiner

*Primary Examiner*—Ngoc Vu
(74) *Attorney, Agent, or Firm*—Brinks Hofer Gilson & Lione

(57) ABSTRACT

Each of a plurality of remote control devices receives user-initiated video selections of any of direct broadcast satellite (DBS) channels, digital subscriber line (DSL) video content, and combinations of DBS channels and DSL video content. Based on the selections, each of a plurality of video processing modules is responsive to a corresponding one of the remote control devices to request any of a DBS channel, DSL video content, and a combination of a DBS channel and DSL video content, and to generate a television signal based thereon. A DBS distribution module simultaneously receives and distributes all DBS channels requested by the video processing modules. A DSL modem receives any DSL video content requested by the video processing modules. A networking module distributes the DSL video content to those of the video processing modules requesting same.

6 Claims, 3 Drawing Sheets

SYSTEM FOR PROVIDING DBS AND DSL VIDEO SERVICES TO MULTIPLE TELEVISION SETS

BACKGROUND OF THE INVENTION

1. Field of the Invention

The present invention relates to direct broadcast satellite (DBS) and digital subscriber line (DSL) video services.

2. Description of the Related Art

Many homes have more than one distribution network to delivery telephony and video services to its various rooms. A telephone distribution network within a home typically comprises twisted-pair copper lines which are connected to a telephony company network. A video distribution network within a home typically comprises coaxial cables which are connected to a cable television provider's network or a DBS dish.

A shortcoming of both DBS services and digital cable video services is that consumers are required to have a digital set-top box per television set. A shortcoming of DBS services, unlike cable television services, is a lack of providing real-time interactive services such as video-on-demand services.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE PREFERRED EMBODIMENTS

Disclosed herein are methods and systems which integrate DBS and DSL networks to deliver interactive entertainment video services in a seamless manner. By combining a broadband data service such as DSL with a DBS service, a complete entertainment package including content such as broadcast video, Pay Per View (PPV), Video-On-Demand (VOD), Near VOD (NVOD), interactive gaming and music can be offered.

A single in-home unit which integrates the DSL network and the DBS network is disclosed herein. The single unit can serve multiple television sets from a single location inside the home using an in-home coaxial distribution network. The single unit beneficially eliminates a need for multiple set-top boxes inside a home to provide multi-channel interactive digital video services to multiple television sets.

Figure 1:
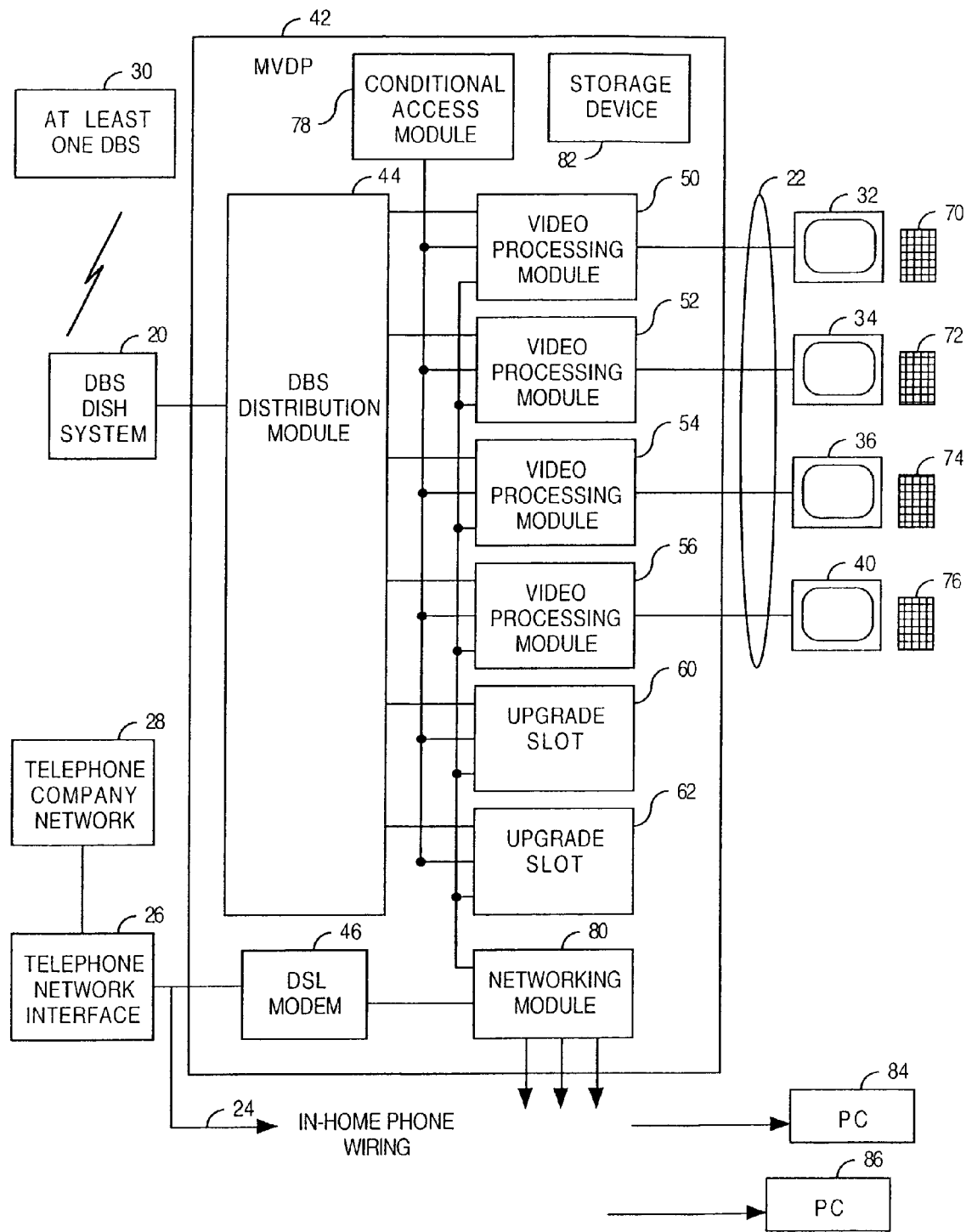
FIG. 1 is a block diagram of an embodiment of a system to integrate DBS and DSL inside a home.

FIG. 1 is a block diagram of an embodiment of a system to integrate DBS and DSL inside a home. The home has a DBS dish system 20, a coaxial distribution network 22, an in-home telephone distribution network 24, and a telephone network interface 26 coupled to a telephone company network 28. The DBS dish system 20 receives direct broadcast satellite programming signals from at least one direct broadcast satellite 30. The coaxial distribution network 22 delivers received video/audio programming to multiple television sets 32, 34, 36 and 40 in the home. The in-home telephone distribution network 24 is coupled to the telephone network interface 26 to provide telephone and DSL services within the home.

The system comprises a multi-channel video/data processor (MVDP) 42. The MVDP 42 serves to provide multi-channel digital video services by generating television signals which integrate audio/video streams from both the DSB and the DSL services. The MVDP 42 also serves to eliminate the need for multiple set-top boxes within the home.

For the purpose of this patent application, the term "video" should be construed as being inclusive of both video with accompanying audio and video without accompanying audio. Further, the term "content" should be construed as being inclusive of audio without accompanying video, video without accompanying audio, and video with accompanying audio.

The MVDP 42 comprises a DBS distribution module 44. The DBS distribution module 44 is coupled to the DBS dish system 20 by a coaxial cable or another transmission medium. The DBS distribution module 44 allows for simultaneous reception of multiple channels provided by the DBS service. The multiple channels may include any combination of broadcast video, PPV, NVOD and non-real-time VOD video received by the DSB dish system 20.

The MVDP 42 further comprises a DSL modem 46 to transmit and receive signals via a DSL network. The DSL network is used to handle real-time interactive services and real-time VOD services. Typically, the DSL network is accessible by the home via the telephone company network 28.

The MVDP 42 further comprises a plurality of video processing modules. For purposes of illustration and example, four video processing modules 50, 52, 54 and 56 are depicted, although any plurality of video processing modules may be employed. The number of video processing modules is based on the number of different television sets that are allowed to receive the video service.

Preferably, each video processing module is embodied by a removable card that facilitates installation in and removal from the MVDP 42. In this case, the MVDP 42 has a plurality of card-receiving slots to receive a plurality of video processing modules. For purposes of illustration and example, the MVDP 42 may have six card-receiving slots to receive at most six video processing modules. Thus, with four video processing modules in the MVDP 42, two card-receiving slots 60 and 62 are unoccupied. The MVDP 42 may be upgraded to accommodate more than four television sets by installing one or two video processing modules in the two card-receiving slots 60 and 62. Alternatively, some of the video processing modules 50, 52, 54 and 56 may be permanently integrated with the MVDP 42, in other words, may be non-removable from the MVDP 42.

The system comprises a plurality of remote control devices 70, 72, 74 and 76 to facilitate independent user control of programming to the television sets 32, 34, 36 and 40, respectively. Each of the remote control devices 70, 72, 74 and 76 receives user-initiated content selections from any of multiple DBS channels, multiple DSL content, and multiple combinations of DBS channels and DSL content. The multiple DBS channels may include multiple broadcast video channels, multiple PPV broadcast channels, multiple NVOD broadcast channels, and multiple non-real-time VOD channels. The multiple DSL content may include multiple VOD video programs, multiple interactive games, and interactive music such as music-on-demand. The multiple DBS-DSL combinations may include multiple interactive programs.

Each of the video processing modules 50, 52, 54 and 56 is responsive to a corresponding one of the remote control devices 70, 72, 74 and 76, respectively. Each remote control device may communicate with its associated video processing module either wirelessly or via a wireline.

Each video processing module requests any of a DBS channel, DSL content, or a combination of a DBS channel and DSL content based on the user-initiated video selection made using the corresponding remote control device.

The DBS distribution module 44 is responsive to the DBS requests from the video processing modules 50, 52, 54 and 56. The DBS requests include those for DBS channels and the DBS portions of DBS-DSL combinations. The DBS distribution module 44 simultaneously receives all DBS channels requested by the video processing modules 50, 52, 54 and 56. A conditional access module 78 enables premium DBS channels to be received and descrambled, if necessary. The DBS distribution module 44 distributes the received DBS channels to those of the video processing modules requesting same.

The DSL modem 46 is responsive to the DSL requests from the video processing modules 50, 52, 54 and 56. The DSL requests include those for DSL content and the DSL portions of DBS-DSL combinations. The DSL modem 46 is to receive via the DSL network all DSL content requested by the video processing modules 50, 52, 54 and 56.

A networking module 80 networks the DSL modem 46 with the video processing modules 50, 52, 54 and 56. The networking module 80 communicates the DSL requests made by the video processing modules 50, 52, 54 and 56 to the DSL modem 46. Further, the networking module 80 receives all DSL content from the DSL modem 46, and distributes the DSL content to those of the video processing modules 50, 52, 54 and 56 requesting same.

For each of the video processing modules 50, 52, 54 and 56 whose selected content includes DSL content, a connection is established through the DSL network between the video processing module and a corresponding server (e.g. a video server) that hosts the content. After validating pre-established rules for VOD content delivery, the video stream is sent to the video processing module for processing.

Each video processing module generates a television signal based on either a DBS channel signal provided by the DBS distribution module 44, a DSL content signal provided by the networking module 80, or a combination of a DBS channel signal and a DSL content signal. Each video processing module has a video decoding/decompression engine with associated support electronics to decode compressed video streams from both the DBS and DSL feeds. For example, each video processing module may comprise a Moving Picture Experts Group (MPEG) decoder/decompression engine to generate a video signal based on an MPEG broadcast stream. For a DBS-DSL combination, the video processing module may blend the DBS channel signal with the DSL content signal. This may involve blending a MPEG2 video broadcast stream with an interactive signal from DSL.

To generate the television signal based on decoded, decompressed and/or blended video, each video processing module includes a radio frequency (RF) modulator. The RF modulator generates a standard television signal on a specific frequency. Examples of the standard television signal include, but are not limited to, National Television Systems Committee (NTSC), digital High-Definition Television (HDTV), digital Standard-Definition Television (SDTV), Phase Alternation each Line (PAL) and Sequential Color with Memory (SECAM). Examples of the specific frequency include, but are not limited to, frequencies corresponding to Very High Frequency (VHF) channels 3 or 4.

Optionally, the MVDP 42 comprises a data storage device 82 to store content downloaded via either DBS or DSL. The stored content can be selected using any of the remote control devices 70, 72, 74 and 76 for playback on any of the television sets 32, 34, 36 and 40, respectively.

In particular, each of the video processing modules 50, 52, 54 and 56 is responsive to its corresponding one of the remote control devices 70, 72, 74 and 76 to request that DBS content, DSL content or DBS-DSL content be stored by the data storage device 82. To facilitate user selection of the record function, the remote control devices 70, 72, 74 and 76 may comprise a dedicated record function key, a soft key temporarily dedicated to the record function, and/or a selection key which facilitates an on-screen selection of the record function.

Further, each of the video processing modules 50, 52, 54 and 56 is responsive to its corresponding one of the remote control devices 70, 72, 74 and 76 to request that stored DBS content, DSL content or DBS-DSL content be retrieved from the data storage device 82 for playback on the corresponding one of the television sets 32, 34, 36 and 40. To facilitate user selection of the record function, the remote control devices 70, 72, 74 and 76 may comprise a dedicated playback function key, a soft key temporarily dedicated to the playback function, and/or a selection key which facilitates an on-screen selection of the playback function.

Using the record and playback functions, the data storage device 82 supports downloading of VOD content via either DBS or DSL for non-real-time VOD services of popular movies and content.

Examples of the data storage device 82 include, but are not limited to, a magnetic storage device, an electronic storage device and an optical storage device. Examples of the magnetic storage device include, but are not limited to, a hard disk drive. Examples of the electronic storage device include, but are not limited to, an electronic memory card storage device. Examples of the optical storage device include, but are not limited to, an optical disk storage device such as a DVD-R or a DVD-RW device.

The networking module 80 also supports broadband data services to personal computers in the home. For purposes of illustration and example, two personal computers 84 and 86 are depicted, although those having ordinary skill will recognize that other numbers of personal computers may be supported by the networking module 80. The networking module 80 may communicate with the personal computers 84 and 86 via either a wireless interface such as 802.11b or a wireline interface. A wireline interface such as HomePNA uses existing telephone wiring within the home for data networking. If the home has Category 5 wiring, the wireline interface may comprise an Ethernet switch module at the MVDP 42 to enable data networking via the Category 5 wiring.

The above-described MVDP 42 enables use of DSL as a two-way communication system which supplements DSL broadcasts, and blending of broadcast DBS video with interactive broadband DSL video content. The MVDP 42 also enables each television set to be equipped with a wireless remote control that is programmed to operate with its corresponding video processing module.

Figure 2:
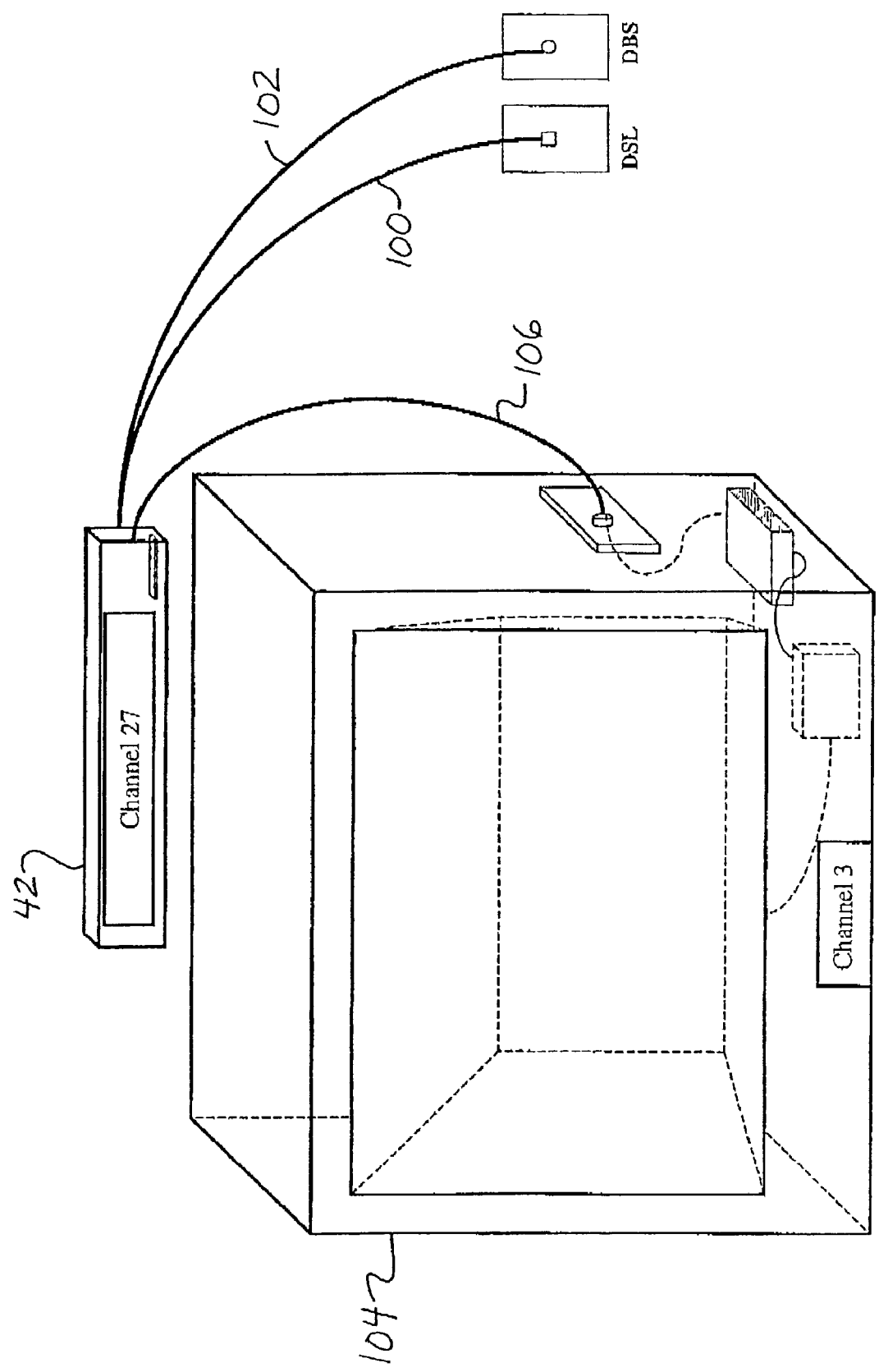
FIG. 2 is an environmental view of an embodiment of a multi-channel video/data processing unit.

FIG. 2 is an environmental view of an embodiment of the MVDP 42. The MVDP 42 has a DSL interface to enable a connection to the DSL network via premise twisted pair wiring 100. The MVDP 42 has a DBS interface to enable a connection to the DBS dish system via coaxial cabling 102.

The MVDP 42 has an output interface to enable a connection to a television set 104 via coaxial cabling 106. The television set 104 is tuned to a fixed frequency, such as the frequency corresponding to VHF channel 3, based on the frequency of the RF modulator in the MVDP 42. The MVDP 42 provides the user-selected content to the television set 104. For example, the user-selected content may comprise an interactive television show on DBS Channel 27.

In an alternative embodiment, the MVDP 42 may be modified to support only one video processing module. In this case, the modified unit may be a set-top box dedicated to a single television set. As another alternative, the modified unit may be integrated with the single television set.

Figure 3:
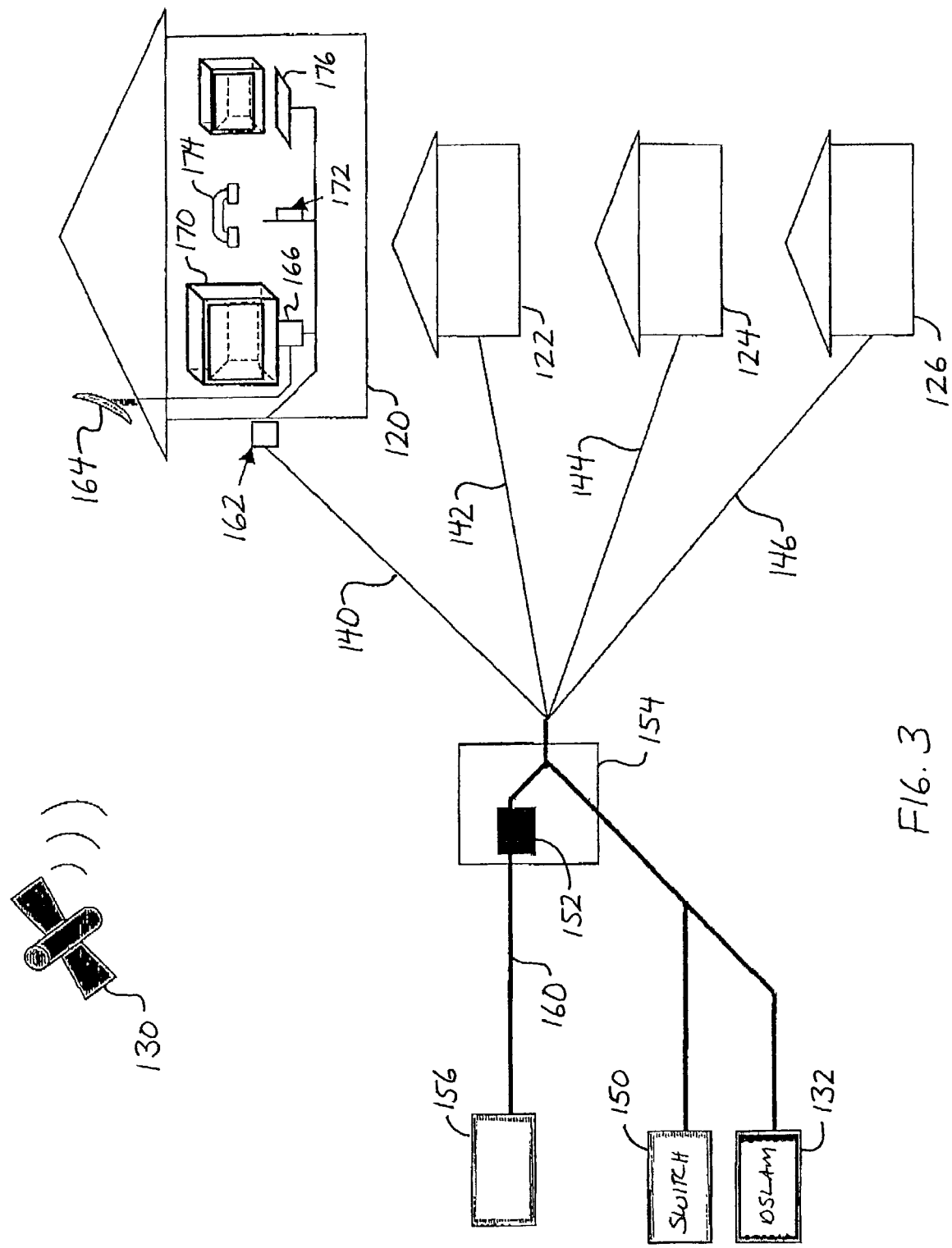
FIG. 3 is a schematic block diagram of an infrastructure to provide an integrated DBS/DSL service to a plurality of homes.

FIG. 3 is a schematic block diagram of an infrastructure to provide an integrated DBS/DSL service to a plurality of homes. For purposes of illustration and example, four homes 120, 122, 124 and 126 are illustrated, although those having ordinary skill will recognize that other numbers of homes may be served. A direct broadcast satellite 130 provides DBS content to homes in a wide geographical area, including the homes 120, 122, 124 and 126. DSL content is provided to homes in a smaller geographical area by either a conventional DSL network or an Ethernet-based DSL network.

A conventional DSL network comprises a DSL Access Multiplexer (DSLAM) 132 located at a telephone company office such as a central office. The DSLAM 132 is capable of providing DSL services to the homes 120, 122, 124 and 126 via existing telephone lines 140, 142, 144 and 146, respectively. The DSLAM 132 may serve hundreds of DSL subscribers in a servicing area. The DSLAM 132 aggregates traffic received from various subscribers to send to a network center via a fiber optic link. The network center, in turn, provides access to a network such as an Internet.

It is noted that telephone services are provided to the homes 120, 122, 124 and 126 via the telephone lines 140, 142, 144 and 146. A telephone switch 150 such as a Class 5 switch provides the telephone services.

Embodiments of Ethernet-based DSL networks are described in detail in a co-pending U.S. Patent Application entitled "ETHERNET-BASED DIGITAL SUBSCRIBER LINE METHODS AND SYSTEMS", having Ser. No. 10/191,981, filed on Jul. 8, 2002, which is hereby incorporated by reference in its entirety in the present disclosure. A brief description of an Ethernet-based DSL network is as follows.

A remote Ethernet device 152 is disposed in a serving area interface 154. The remote Ethernet device 152 serves as an Ethernet bridge for a neighborhood service area which includes the homes 120, 122, 124 and 126. The remote Ethernet device 152 communicates with modems in the homes using an Internet Protocol over a first Ethernet standard with a DSL physical layer. Preferably, the first Ethernet standard is either a Twisted Ethernet standard suitable for communicating data over a twisted pair transmission line such as standard telephone transmission line, or another wire-based Ethernet standard. The DSL physical layer may be based on at least one of Data Over Cable Service Interface Specifications (DOCSIS), Asymmetric Digital Subscriber Line (ADSL), Very-high-data-rate Digital Subscriber Line (VDSL), Symmetrical Digital Subscriber Line (SDSL), and Multirate DSL (MDSL).

The remote Ethernet device 152 communicates with an Ethernet switch 156 disposed at a central office via a fiber optic medium 160 using an Internet Protocol over a second Ethernet standard. Preferably, the second Ethernet standard comprises a gigabit Ethernet standard or another Ethernet standard suitable for communicating data over fiber optic transmission media. The Ethernet switch 156 provides a packet data core network termination.

Regardless of whether conventional DSL or Ethernet-based DSL is used, the home 120 has access to the DSL and telephone networks at a gateway 162. The home 120 has a DBS dish system 164 to provide access to the DBS network via the direct broadcast satellite 130. A DBS-DSL integrator 166, such as an MVDP, is coupled to the DBS dish system 164 and the gateway 162. The DBS-DSL integrator 166 provides video services to a television set 170. A filter 172 is interposed between a telephone 174 and the gateway 162 to mitigate interference between DSL and voice services. A personal computer 176 can access the DSL network either directly from the gateway 162 or from a networking module of the DBS-DSL integrator 166.

It will be apparent to those skilled in the art that the disclosed inventions may be modified in numerous ways and may assume many embodiments other than the preferred forms specifically set out and described herein. For example, other interactive point-to-point broadband networks may be substituted for DSL, other broadcast video services such as cable television may be substituted for DBS, and other types of input devices may be substituted for the remote controls.

Accordingly, it is intended by the appended claims to cover all modifications which fall within the true spirit and scope of the present invention.

What is claimed is:

1. An apparatus, comprising:
  a video processing module operable to receive a user-initiated video selection and generate a television signal based on the user-initiated video selection, wherein the user-initiated video selection comprises a direct broadcast satellite (DBS) channel, digital subscriber line (DSL) content, or both video from at least one DBS channel and video from DSL content;
  a DBS distribution module electrically coupled with the video processing module, the DBS distribution module operable to receive a plurality of DBS channels, receive a request from the video processing module for at least one requested DBS channel of the plurality of DBS channels, and distribute the at least one requested DBS channel to the video processing module in response to the request from the video processing module;
  a DSL modem electrically coupled with the video processing module, the DSL modem operable to receive DSL content via a DSL network, receive a request from the video processing module for requested DSL content, and distribute the requested DSL content to the video processing module in response to the request from the video processing module; and
  a second video processing module operable to receive a second user-initiated video selection and generate a second television signal based on the second user-initiated video selection;
  wherein the DBS distribution module is further electrically coupled with the second video processing module and the DBS distribution module is further operable to receive a request from the second video processing module for at least one requested DBS channel of the plurality of DBS channels and distribute the at least one requested DBS channel to the second video processing module in response to the request from the second video processing module;
  wherein the DSL modem is further electrically coupled with the second video processing module and the DSL modem is further operable to receive a request from the second video processing module for requested DSL content and distribute the requested DSL content to the second video processing module in response to the request from the second video processing module; and wherein the video processing module is operative to generate a video signal combining video from at least one DBS channel and video from DSL content, the video signal for simultaneously displaying at least a portion of the video from at least one DBS channel and at least a portion of the video from the DSL content on a display device.

2. The apparatus of claim 1, further comprising:

a remote control device operable to send the user-initiated video selection to the video processing module.

3. The apparatus of claim 1, further comprising:

a personal computer electrically coupled with the DSL modem to receive DSL content.

4. The apparatus of claim 1, further comprising:

a data storage device electrically coupled with the DBS distribution module and the DSL modem to receive and store at least one DBS channel and DSL content for subsequent playback.

5. The apparatus of claim 1, further comprising:

a first remote control device operable to send the user-initiated video selection to the video processing module; and a second remote control device operable to send the second user-initiated video selection to the second video processing module.

6. The apparatus of claim 1, further comprising at least two computer-card receiving slots electrically coupled with the DBS distribution module and the DSL modem;

wherein the video processing module is a computer card operable to be received by a first computer-card receiving slot; and wherein the second video processing module is a computer card operable to be received by a second computer-card receiving slot.

* * * * *